V. W. KLIESRATH AND R. KNOPP.
COIL SPRING.
APPLICATION FILED FEB. 16, 1920.

1,365,701.

Patented Jan. 18, 1921.
3 SHEETS—SHEET 1.

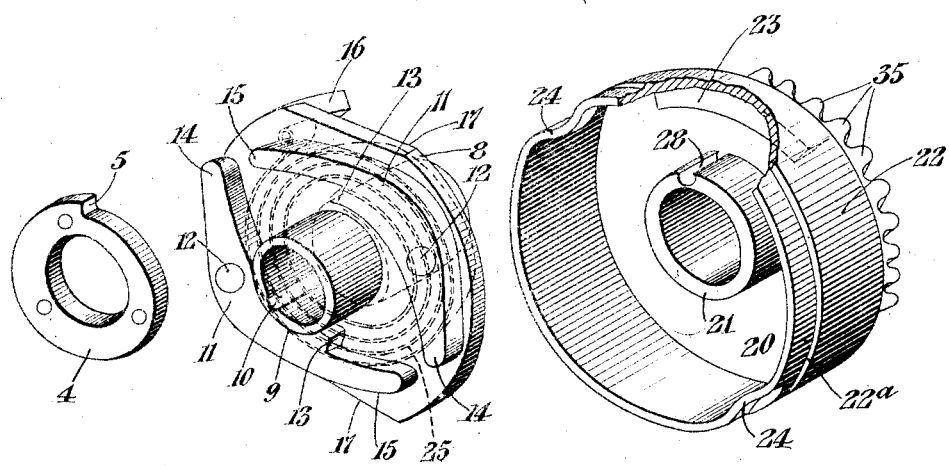
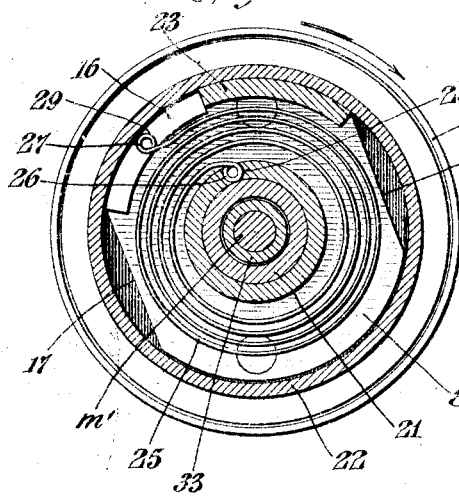
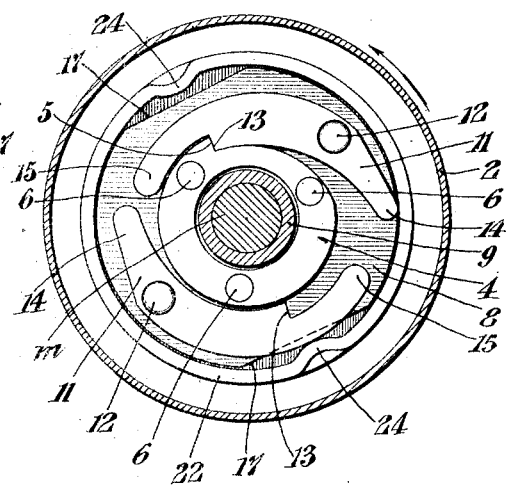

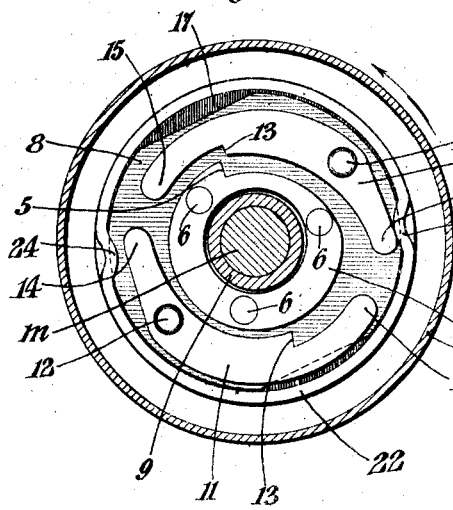

UNITED STATES PATENT OFFICE.

VICTOR W. KLIESRATH, OF EAST ORANGE, AND RUDOLPH KNOPP, OF MONTCLAIR, NEW JERSEY, ASSIGNORS TO THE SIMMS MAGNETO COMPANY, OF EAST ORANGE, NEW JERSEY, A CORPORATION OF NEW JERSEY.

COIL-SPRING.

1,365,701.  Specification of Letters Patent.  Patented Jan. 18, 1921.

Original application filed May 31, 1919, Serial No. 301,129. Divided and this application filed February 16, 1920. Serial No. 358,826.

*To all whom it may concern:*

Be it known that we, VICTOR W. KLIESRATH, a citizen of the United States, and RUDOLPH KNOPP, a citizen of Austria, residing, respectively, at East Orange, in the county of Essex and State of New Jersey, and Montclair, in the county of Essex and State of New Jersey, have invented certain new and useful Improvements in Coil-Springs; and we do hereby declare the following to be a full, clear, and exact description of the invention, such as will enable others skilled in the art to which it appertains to make and use the same.

Our invention consists in the novel features hereinafter described, reference being had to the accompanying drawing which illustrates one embodiment of the same, selected by us for purposes of illustration, and the said invention is fully disclosed in the following description and claim.

This application is a division of our former application for improvements in impulse starter coupling filed May 31, 1919, and given Serial No. 301,129.

In the manufacture of spiral torsional springs, it is customary to wind a spring material about a mandrel to form a series of substantially concentric spiral coils, and the springs are tempered and set so that when completed, the coils are practically concentric. In the operation of such concentrically formed springs under variations of torsional compression and expansion, it is well known that they are extremely apt to break, and that the several coils are brought into contact usually at a number of points when the springs are wound or subjected to torsional compression. We have found by experience that the effect of this contact between the coils of a spiral spring is to produce an unequal bending of the spring material, some portions of the spring being subjected to greater bending than others, together with a frictional wear between the coils so forced into contact, and further, we have ascertained by experiment and observation that when springs of this kind break, it is almost without exception at or adjacent to these points of wear. This type of spring has always been more or less unsatisfactory in use both on account of its liability to break, which appears to be due to a crystallization of the spring, due to the increased bending strain adjacent to the points of contact, and also because the frictional resistance between the coils retards the action of the spring, and also prevents the spring from exercising its full power as it would do were it equally bent torsionally throughout its entire extent and could exert the entire resilience of the spring body.

We have discovered that by forming a spiral spring in the manner hereinafter described, all of these defects in the operation of spiral springs can be avoided, and a practically unbreakable spring can be produced. According to our invention, we form the spring in a series of successive curved portions having different centers and different radii, the latter increasing from the inner end of the spring to the outer end thereof, and the said centers being located in different radial directions from the center of the innermost curved portion of the spring, and ordinarily within the innermost coil thereof. It follows, therefore, that when this spring is formed, tempered, and set, in the manner just described, its coils are composed throughout its length of eccentrically curved portions of the spring material, and when the spring is compressed torsionally, its coils tend to assume a more nearly concentric relation without coming in contact with each other at any point in the length of the spring, so that the entire resilience of the entire length of the spring is available at all times; the spring is always compressed or bent equally throughout its entire length, and there is no rubbing or frictional contact between adjacent coils, and consequentlly no retardation of the spring action, and no crystallization of the material during any ordinary use to which these springs have ever been subjected.

In the accompanying drawings we have shown one embodiment of our improved spring designed especially for use in connection with what is termed an impulse starter coupling for magnetos, and it is herein shown and described in connection therewith. It is to be understood, however, that the impulse starter coupling herein shown and described is not claimed, but forms the subject matter of our former application above referred to, of which this application is a division.

Referring to the accompanying drawings which set forth an embodiment of our invention selected by us for the purpose of illustrating the same, Figure 1 represents a side elevation of our improved coupling, the position of the magneto being indicated in dotted lines, and the driving shaft being broken away.

Fig. 3 is a detail perspective view showing the locking plate, the driven member, the driving member, and other associated parts.

Fig. 4 is a vertical transverse sectional view on the line 4—4 of Fig. 2, looking in the direction of the arrow Fig. 5 is a similar sectional view taken on the line 5—5 of Fig. 2, and looking in the direction of the arrow.

Fig. 6 is a view similar to Fig. 5 illustrating the operation of one of the cams on the driving member in disengaging one of the locking devices carried by the driven shaft.

Fig. 7 is a similar view showing the normal position of the locking levers when the parts are operating at normal speed, and said levers are held out of operative position by centrifugal force.

Fig. 8 is a detail view of our improved spiral spring which we prefer to employ in our improved coupling, as it appears after being formed, tempered, and set, and before being placed under compression.

Figure 1:
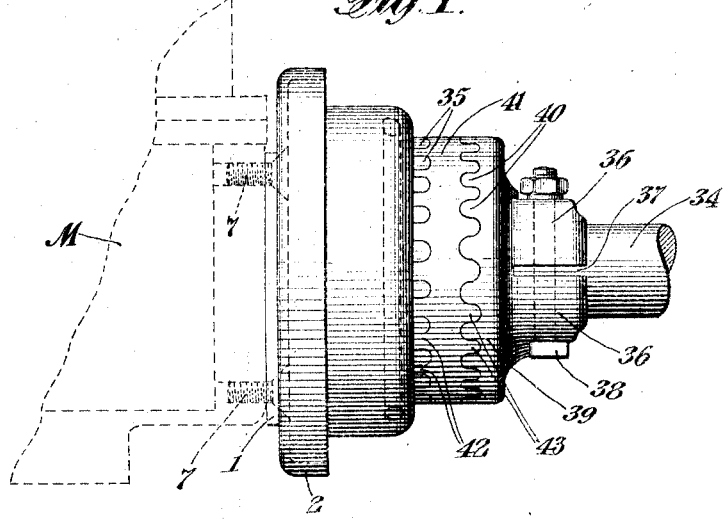
Figure 2:
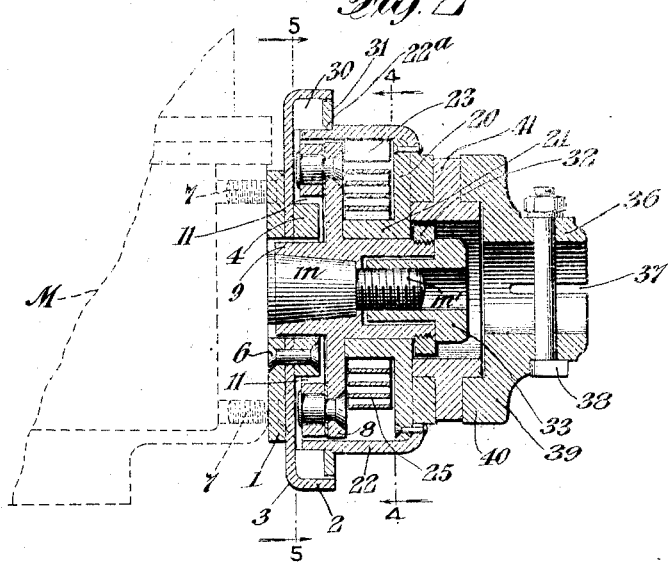
Fig. 2 is a vertical sectional view of the same, the driving shaft being removed.

In the accompanying drawings, 1 represents a stationary plate of any desired form, provided with means, as screws for example, by which it may be secured rigidly to the frame of a magneto, indicated at M, in dotted lines in Figs. 1 and 2, the said plate being provided with a central aperture through which the shaft of the magneto armature, indicated at m in Fig. 2, may pass. This stationary plate 1 is preferably provided with an outwardly extending dust flange, indicated at 2, and is also provided with an annular locking hub, indicated at 4, provided with a locking shoulder 5. For convenience of manufacture, we prefer to provide the locking plate 1 with a thin plate or stamping 3, carrying the annular dust flange 2, and to make the hub 4 separate from the plate and attach the hub 4, plate 3, and plate 1, together by means of rivets, one of which is indicated at 6 in Fig. 2, or otherwise, but we do not limit ourselves to this construction. The plate 1 is shown provided with screws, indicated in dotted lines at 7, for attaching it to the frame of the magneto, and it will be seen that the armature shaft m, which is preferably provided with a tapered portion, and an exterior threaded portion, projects through the central apertures in the plates 1 and 3 and hub 4. The driven member of our improved coupling comprises a disk 8 having a central sleeve 9 projecting on both sides of the same, the inner end of the sleeve 9 being preferably tapered to fit the tapering portion of the shoulder of the armature shaft m, and provided with a keyway 10 to receive a key (not shown) for rigidly securing it to the armature shaft.

On its inner face the disk 8 carries a pair of pivoted centrifugally controlled locking levers 11—11 pivoted at 12—12 to the disk 8. Each of these levers is provided with a locking detent 13 located on one side of its pivot and with a cam engaging portion 14 on the other side of its pivot, and each of said levers is provided with an extension 15 on the side of the pivot adjacent to the detent and projecting beyond the detent, increasing the length of the lever on that side of its point of pivoting, said extension 15—15 acting as centrifugal weights to withdraw the locking levers to their inoperative positions whenever the armature shaft is being rotated at sufficient or predetermined speed, to produce the desired spark. We prefer to construct the levers in substantially the manner described with the weighted ends or extensions projecting beyond the locking detents and located at the opposite ends of the lever from their cam engaging portions 14. One advantage of this construction is that by varying the length of the projecting portions 15, the coupling may be readily adapted for use under circumstances requiring the maintenance of different magneto speeds without varying any other portion of the apparatus. In the accompanying drawings we have shown our invention applied to a coupling intended for use with a magneto producing two sparks per revolution of the armature shaft, and as will be readily understood, either one of the locking levers 11 may engage the locking shoulder 5 of the locking hub 4, said shoulder being located on the upper side of the hub, so that the disk 8, and the armature shaft m with which it is rigidly connected, may be locked in two positions at opposite points in the revolution thereof. The disk 8 is also provided on its outer face with a stop lug or projection 16, and segmental portions of said disk on opposite sides of the center are cut away, as indicated at 17—17, to facilitate assembling the parts.

The driving member of the coupling comprises a disk 20 provided with a sleeve 21 projecting from the inner face thereof and adapted to fit over with a bearing fit, and rotate upon the exterior portion of the sleeve 9 of the driven member. The disk 20 is also provided with an annular housing 22 which may be formed integrally with the disk, or may be formed separately and secured thereto, which housing extends within the annular recess formed by the dust flange 2 (see Fig. 2). On its inner face the disk 20 is also provided with a stop lug 23 for engaging the stop lug 16 on the driven disk 8, and the driving disk 20 is also provided, in this instance at points diametrically opposite to each other, with cams 24—24, for engaging the ends 14—14 of the locking levers, and positively withdrawing them from locking position with respect to the locking hub 4. These cams 24 may be formed in any desired way, but we find it convenient to form them by indenting portions of the housing 22, as shown best in Fig. 3.

Between the driving and driven members of the coupling we interpose a spring 25 of peculiar construction, which we have found to be especially desirable for use in this device. In the formation of the ordinary spiral springs, the spring material is coiled about a common center in the form of a spiral, or in other words, the coils have a constantly increasing radius. Such springs when placed under compression, have their coils forced into contact with each other at various points. This produces two very objectionable results. In the relative movements of the spring coils when the spring expands, a considerable amount of friction is caused which materially retards the movement imparted by the spring and makes it slower than would otherwise be the case. Again, the fact that the spring coils contact at various points interferes with an absolutely uniform distribution of the stress through the entire length of the spring, and puts certain parts of the spring under greater stress than others, with the result that the highly tempered material rapidly crystallizes, and such springs are continually breaking. In our improved impulse starter coupling it is of greatest importance that the spring should not break, as the result would be to stop the operation of the magneto and the engine with which it is connected, and secondly there must be nothing to interfere with the rapid motion imparted by the spring, as one of the principal objects of the coupling is to impart very rapid movement to the armature shaft, and anything which tends to slow this movement effected by the tension of the spring, tends to defeat the operation of the device.

As a result of much study and experiment we have found that a spring designed substantially as shown in detail in Fig. 8, being substantially eccentric throughout its entire extent and increasing the distance between adjacent coils, produces the most advantageous results in our coupling without any of the difficulties which have been heretofore experienced in the use of spiral springs, but are located usually in the same plane. In forming this spring, we take a rod or band (preferably a band) of spring material and bend it into the form shown in Fig. 8 for example, in which the several coils, substantially three coils being herein shown, are in the same plane and gradually increase in distance from each other and are bent into curved form, successive portions of each coil being curved concentrically with or about totally different centers, disposed in different positions radially with respect to the center of the innermost portion of the inner coil. In Fig. 8, for example, arrows are indicated leading from ten different centers in different directions to portions of the spring curved about or concentric therewith. We do not limit ourselves to the exact number of different and distinct centers which we may employ in laying out this spring, or in the precise proportions of the length of the successive portions of the spring to be formed about or concentric with each of said centers, as reasonable variations may be made in the same within the limits of our invention, the essential feature of which is that successive portions of the spring coils shall be curved concentrically with or about entirely different and distinct centers, substantially as in the manner shown in Fig. 8, so that when the spring is coiled down and placed under its normal tension, every portion of the spring throughout its length shall be subject to the same tension, and so that the several coils will be equally distant from each other throughout their entire length, as indicated for example in Fig. 4, in which the spring 25 is shown under tension. Our improved spring is formed, tempered, and set in substantially the form shown in Fig. 8, and when given its required tension, it will assume substantially the form of an ordinary spiral spring when tempered and set, before any tension is applied thereto, and the several centers will be brought into substantially concentric relation. Further compression of our improved spring 25 will continue to distribute the strain uniformly throughout the entire length of the spring without distorting any of the coils, or bringing any coil in frictional contact with another, and the spring therefore has no tendency to crystallize, and can at all times exercise its maximum resiliency with the result of securing the highest possible speed of rotation. In other words, whereas increased tension tends to distort the coils of ordinary spiral spring out of concentric relation and force the coils into contact with each other, our improved spring is so constructed that increased tension tends to force its coils into a concentric relation which they do not have when formed, set, and tempered.

For convenience in inserting the spring 25, we conveniently roll up the ends of the spring to form the cylindrical retaining portions 26—27, which are connected respectively to the driving member 20 and the driven member 8. We prefer to form a nearly cylindrical recess 28 in the sleeve 21 of the driving member, to receive the end 26 of the spring, and a similar recess 29 is provided in the stop lug 16 of the disk 8 to receive the other end 27 of the spring, as clearly shown in Fig. 4. When the parts are assembled, as shown in Fig. 4, the normal tension of the spring tends to hold the stop lug 16 of the driven member or disk 8 in contact with the stop lug 23 of the driving member 20. In assembling the parts, the cut off segments forming the straight sides 17—17 of the disk 8 permit the disk to be inserted within the housing 22 past the opposite cams 24—24, as indicated in Fig. 5, and to pass beyond these cams which are in the same plane as the locking levers 11.

In assembling the parts a felt washer 30 (see Fig. 2) is inserted within the dust flange 2, and a dust ring, indicated at 31, Fig. 2, is pressed on a reduced portion 22ᵃ of the housing 22, to engage the washer 30 within the dust flange 2, thus effectually sealing the device against the ingress of dust or other extraneous matter. The parts can be held in operative relation in any desired manner. In the present instance we have shown a nut 32 screwed on the outer end of the sleeve 9 for holding the driving and driven members together, and we have also shown a hollow sleeve nut 33 screwed on the threaded portion m' for holding the sleeve 9 firmly in engagement with the conical portion of the armature shaft. The driving member may be provided with any suitable means for connecting it with the driving shaft, indicated in Fig. 1, at 34. In the present instance we have shown the outer face of the driving member or disk 20 provided with a plurality of serrations or projections, indicated at 35, and being preferably twenty in number. We have also shown the driving shaft, which is ordinarily mounted in axial alinement with the shaft m of the magneto, provided with a driving collar 36, bored to fit the shaft, and split, as indicated at 37, and provided with a securing bolt 38, which preferably passes through the collar and shaft transversely of the split 37 in the collar, so as to clamp the collar on the shaft, as well as to secure it to rotate therewith. This collar is provided with a flange portion 39 of substantially the same diameter as the driving disk 20, and has its inner face provided with a plurality of serrations or projections 40, one less in number than the number of projections or serrations 35 on the disk 20, in other words, in this instance having nineteen projections. We also provide an intermediate driving ring indicated at 41, which is preferably made of resilient material such as vulcanized rubber, of the desired degree of softness, which is provided on its inner face with a plurality of serrations or projections 42 of the same number as those of the disk 20, for interchanging the same, and on its outer face is provided with a plurality of serrations or projections 43 corresponding in number with those of the driving collar 36, and interchanging with the same. We find this construction desirable in that it provides a resilient connection between the driving shaft and the driving member of the coupling which will take up sudden shocks and jars, and it also provides in effect what may be termed a vernier type of adjustment, by means of which the timing of the magneto with the engine may be effected so as to bring the instant of ignition of the engine in proper timed relation with the sparking positions of the armature.

Assuming that the parts are stationary, and it is desired to start the engine, the engine is rotated by hand or by a suitable starter in such direction as to impart movement to the driving member 20 in the direction of the arrows in Figs. 4 and 5, it being understood that the sections represented in these figures are viewed from opposite directions. The driven member 8 and the armature shaft m will be locked from movement by the engagement of one of the locking levers 11 with the locking hub 4, as shown in Fig. 5. The rotation of the driving member 20 will cause the sleeve 21 carrying the inner end of the spring to move in the direction of the arrows in Fig. 4, and increase the tension of the spring, and will also cause the stop lug 23 to move away from the stop lug 16, of the driven member. As the rotation of the driving member proceeds one of the cams 24 will be brought into engagement with the end 14 of the locking lever 11, in engagement with the locking hub, thereby tripping said lever, as shown in Fig. 6, and releasing the driven member 8 of the coupling, which is then acted upon by the compressed spring 25 to effect a partial rotation at very high speed to the armature shaft, also in the direction of the arrows in the several figures, until the stop lug 16 on the driven member 8 catches up with and engages the stop lug 23 on the driving member 20, thus imparting the necessary high speed to the magneto armature to produce a strong spark for ignition purposes. After a half revolution the other lever 11 will engage the locking hub 4, locking the driven member and armature shaft, when the operation just described is repeated. This operation is repeated at every half revolution of the armature shaft until the driving shaft attains a sufficient speed to cause the weighted ends of the levers 11 to be acted upon by centrifugal force so as to hold said levers out of engagement with the locking hub 4 after which the driven member will be rotated at the same speed as, and with, the driving member, the power being transmitted through the spring 25 under its normal compression or tension, said spring acting as a yielding connection between the driving and driven members under normal high speed conditions. If for any reason the speed of the engine slows down to such a point that the locking levers 11 are no longer held out of operation by centrifugal force, the levers will successively engage the locking hub 4 and the armature shaft will be driven by the series of intermittent rapid impulses instead of by steady or continuous rotation, in the same manner as in starting.

While we have shown our improved spring as applied to and forming part of an impulse starter coupling in order to illustrate its construction and operation, it is to be understood that it may be used for any other purpose for which it may be found desirable or advantageous.

What we claim and desire to secure by Letters Patent is:—

1. As a new article of manufacture, a torsional spring, said spring when in expanded condition, having successive portions throughout its length curved about different centers located in different positions radially with respect to the center of the innermost curved portion of the spring, said centers being so disposed that when said spring is wound in a rotary direction to compress the spring, all portions of the spring will be substantially uniformly bent, and the centers of said successive curved portions will be maintained substantially in concentric relation, and the coils will be maintained out of contact with each other.

2. As a new article of manufacture, a torsional spring having a plurality of coils in substantially the same plane, said spring when in expanded condition having successive portions curved about different centers, and located within the innermost coil of the innermost curved portion of the spring, the several coils being separated different distances, increasing gradually from the inner end of the inner coil to the outer end of the spring, whereby when said spring is wound in a rotary direction to compress it, all portions thereof will be substantially uniformly bent, and the said different centers of the said successive portions will be brought into, and maintained in substantially concentric relation, and the coils will be held in substantial parallelism.

3. As a new article of manufacture, a torsional spring having a plurality of coils, said spring when in expanded condition having successive portions curved about different centers located within the innermost coil, and in different radial positions with respect to the center of the innermost portion of the inner coil, said successive portions having radii of different lengths, the radii of successive portions increasing from the inner end of the spring to the outer end thereof, whereby when said spring is compressed in a rotary direction, all portions thereof will be substantially uniformly bent, and said different centers will be brought into, and maintained in substantially concentric relation with respect to each other and the coil, and the several coils of the spring will be brought into and maintained in substantial parallelism without contact at any point therein.

In testimony whereof we affix our signatures.

VICTOR W. KLIESRATH.
RUDOLPH KNOPP.